UNITED STATES PATENT OFFICE.

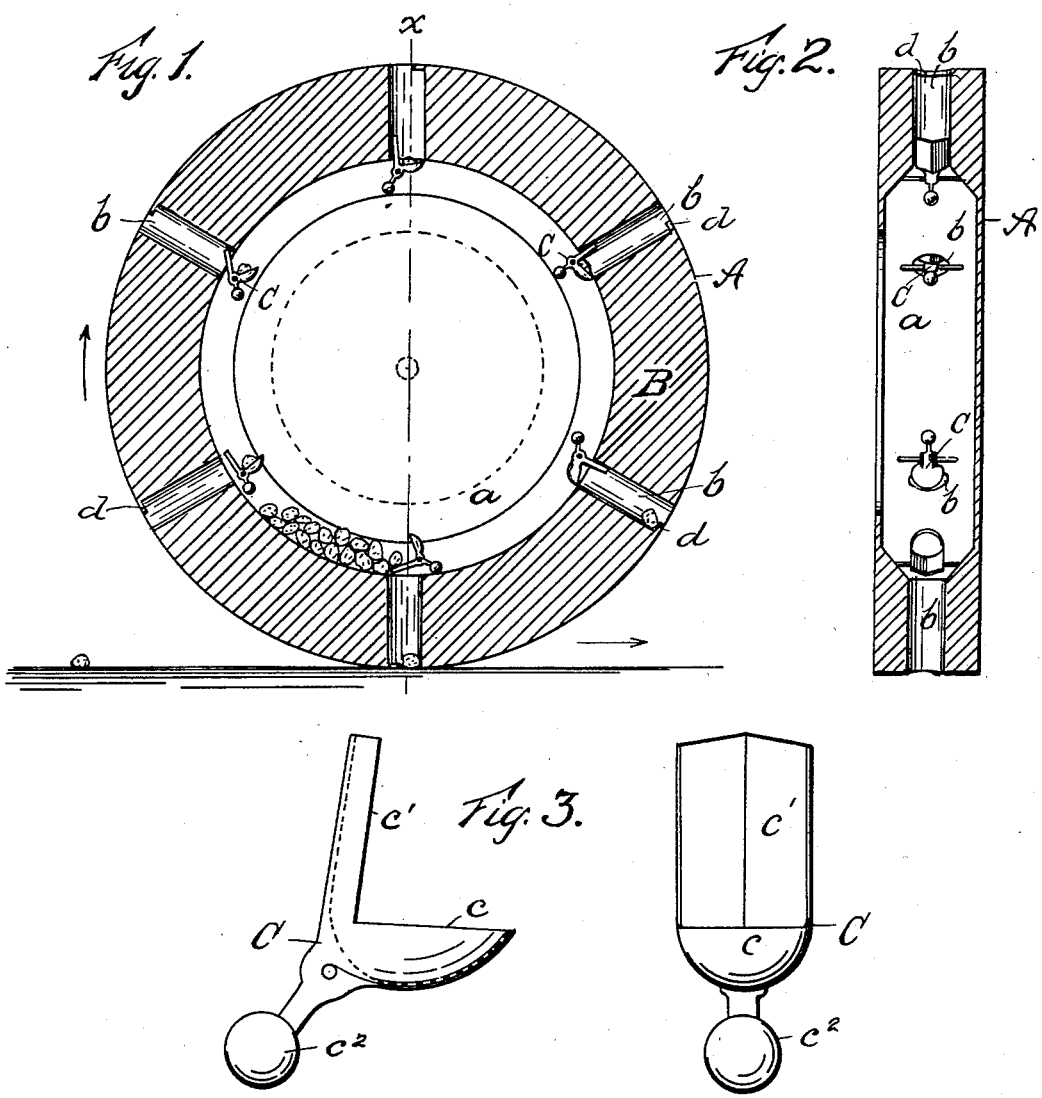

JOSEPH SHEARER AND WILLIAM J. SHEARER, OF READING, PENNSYLVANIA.

POTATO-PLANTER.

SPECIFICATION forming part of Letters Patent No. 655,460, dated August 7, 1900.

Application filed May 10, 1900. Serial No. 16,139. (No model.)

*To all whom it may concern:*

Be it known that we, JOSEPH SHEARER and WILLIAM J. SHEARER, citizens of the United States, residing at Reading, Berks county, Pennsylvania, have invented certain new and useful Improvements in Potato-Planters; and we do hereby declare the following to be a full, clear, and exact description of the invention, such as will enable others skilled in the art to which it appertains to make and use the same.

This invention relates to improvements in potato-planters, the object being to construct a device that will place the seed-potatoes positively and at regular intervals.

The invention is fully described in the following specification and clearly illustrated in the accompanying drawings, in which—

Figure 1 is a vertical cross-section of our device. Fig. 2 is a sectional view taken on line $x\,x$, Fig. 1. Fig. 3 shows enlarged details of the L-shaped cup in side and front elevation.

The wheel A is formed with a hollow central receptacle $a$, into which the seed-potatoes are fed by means of any suitable feed device. (Not shown.) The wheel A is also formed with a series of equidistant openings $b$, each leading from the hollow receptacle $a$ through the rim B to the periphery thereof and there restricted by a flange $d$, standing within the periphery of the wheel and at the forward side of the opening in the direction of rotation. A weighted cup C is pivoted within the wheel adjacent to the inner end of each of the openings $b$ and at the rear side thereof in the direction of rotation. These cups are of L shape and formed with a spoon-shaped portion $c$, and at about right angles thereto is a V-shaped scoop $c'$, while a weight $c^2$ is formed on the underside thereof and adapted to counterbalance the spoon.

The potatoes after being placed in the receptacle A are picked up, one in each cup, by the turning of the wheel A as it progresses in the direction indicated by the arrow in Fig. 1. The scoop $c'$ gathers a single potato and allows it to roll across the inner end of the opening $b$ into the spoon $c$, and as the wheel revolves the weighted cup will carry the potato around with it, as shown in the drawings, until it has made almost a complete revolution, when it will be delivered into the corresponding opening $b$ and will roll to the outer end thereof and there rest on the flange $d$, which extends partly across the outlet of said opening and is of sufficient width to prevent the potato falling out until it comes in contact with the ground, when it will be placed in or on the ground, as illustrated in Fig. 1. Each cup is adapted to carry but a single potato, and as the wheel revolves they will be scooped up one at a time and deposited on the ground at equal distances as each opening $b$ comes in contact therewith.

In our machine the potatoes cannot become choked or clogged at any point of the operation. The action is positive and regular.

Having thus fully described our invention, what we claim, and desire to secure by Letters Patent, is—

1. A potato-planter comprising a rotating wheel with a thick rim provided with radial openings, flanges at the outer ends of said openings on the forward side thereof in the direction of rotation and standing entirely within the periphery of the wheel, and cups pivoted within the wheel entirely inside said rim and adapted to deliver the potatoes automatically through said openings, all substantially as described.

2. A potato-planter comprising a rotating wheel with a thick rim provided with radial openings restricted at their outer ends; combined with a weighted cup for each opening pivoted within the wheel entirely inside said rim and held by its weight normally across the inner end of the opening, substantially as described.

3. A potato-planter comprising a rotating wheel with a thick rim provided with radial openings restricted at their outer ends; combined with an L-shaped cup for each opening standing within the wheel and entirely inside said rim, pivoted at its angle, and comprising a scoop in one arm and a spoon in the other, the whole operating substantially as described.

4. A potato-planter comprising a rotating wheel with a thick rim having radial openings; combined with an L-shaped cup pivoted at its angle entirely within the wheel adjacent each opening, at the rear of such opening in the direction of rotation, and comprising a scoop in one arm and a spoon in the other communicating therewith, and a weight projecting from the angle and holding the scoop normally across the inner end of the opening, the whole operating substantially as described.

5. A potato-planter comprising a rotating wheel with a thick rim having radial openings; combined with an L-shaped cup pivoted at its angle entirely within the wheel adjacent each opening and comprising a V-shaped scoop in one arm and a spoon in the other communicating therewith, and a weight projecting from the angle and holding the scoop normally across the inner end of the opening, the whole operating substantially as described.

In testimony whereof we affix our signatures in presence of two witnesses.

JOSEPH SHEARER.
WILLIAM J. SHEARER.

Witnesses:
 ED. A. KELLY,
 W. M. LEINBACH.